(12) United States Patent
Son et al.

(10) Patent No.: US 9,986,470 B2
(45) Date of Patent: May 29, 2018

(54) METHOD AND APPARATUS FOR PERFORMING HANDOVER IN WIRELESS COMMUNICATION SYSTEM

(71) Applicant: Samsung Electronics Co., Ltd., Suwon-si, Gyeonggi-do (KR)

(72) Inventors: Jae-Seung Son, Suwon-si (KR); Eun-Tae Won, Seoul (KR); Noh-Gyoung Kang, Seoul (KR); Tae-Han Bae, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 334 days.

(21) Appl. No.: 14/250,822

(22) Filed: Apr. 11, 2014

(65) Prior Publication Data

US 2014/0307708 A1      Oct. 16, 2014

(30) Foreign Application Priority Data

Apr. 11, 2013  (KR) .......................... 10-2013-0039852

(51) Int. Cl.
*H04W 36/00*   (2009.01)
*H04W 36/14*   (2009.01)

(52) U.S. Cl.
CPC ........ *H04W 36/0055* (2013.01); *H04W 36/14* (2013.01)

(58) Field of Classification Search
None
See application file for complete search history.

(56) References Cited

U.S. PATENT DOCUMENTS

| 7,711,366 | B1 | 5/2010 | O'Neil et al. |
| 2005/0148368 | A1 | 7/2005 | Scheinert et al. |
| 2006/0286984 | A1 | 12/2006 | Bonner |
| 2007/0218902 | A1 | 9/2007 | Smyk et al. |
| 2008/0101293 | A1 | 5/2008 | Woo et al. |
| 2008/0161000 | A1* | 7/2008 | Li ..................... H04W 36/0055 455/436 |
| 2008/0287080 | A1 | 11/2008 | Camp, Jr. et al. |
| 2009/0109921 | A1 | 4/2009 | Bowen |
| 2009/0124235 | A1 | 5/2009 | Bosch et al. |
| 2009/0207812 | A1* | 8/2009 | Gupta et al. .................. 370/332 |

(Continued)

FOREIGN PATENT DOCUMENTS

| EP | 02 071 775 A1 | 6/2009 |
| EP | 02 410 789 A1 | 1/2012 |

(Continued)

*Primary Examiner* — Manuel Rangel
(74) *Attorney, Agent, or Firm* — Jefferson IP Law, LLP

(57) ABSTRACT

A method for performing handover between heterogeneous networks by a User Equipment (UE) in a wireless communication system is provided. The method includes periodically sending a first node a measurement report message while being provided a communication service from the first node using a first frequency band, the measurement report message including measurements for the first node and at least one other node using a different frequency band than the first frequency band, and exchanging information, required to perform handover to a second node having a greatest measurement among the at least one other node, with the second node if a handover preparation request message is received from the first node.

24 Claims, 14 Drawing Sheets

(56) References Cited

U.S. PATENT DOCUMENTS

| | | |
|---|---|---|
| 2009/0323636 A1 | 12/2009 | Dillon et al. |
| 2010/0041405 A1* | 2/2010 | Gallagher et al. ............ 455/436 |
| 2010/0074228 A1 | 3/2010 | Hicks et al. |
| 2010/0081428 A1 | 4/2010 | Maejima et al. |
| 2010/0091653 A1 | 4/2010 | Koodli et al. |
| 2010/0273475 A1 | 10/2010 | Lee et al. |
| 2011/0223885 A1* | 9/2011 | Salkintzis et al. ............ 455/411 |
| 2012/0002650 A1* | 1/2012 | Yanagisako ........... H04W 24/02 370/338 |
| 2012/0084364 A1 | 4/2012 | Sivavakeesar |
| 2012/0088507 A1* | 4/2012 | Legg ................... H04W 36/245 455/436 |
| 2012/0099562 A1 | 4/2012 | Smadi et al. |
| 2012/0113959 A1* | 5/2012 | Sugizaki et al. ............. 370/331 |
| 2012/0157103 A1* | 6/2012 | Frenger ............ H04W 36/0055 455/437 |
| 2012/0177007 A1* | 7/2012 | Kagimoto ............... H04W 4/20 370/331 |
| 2012/0182896 A1 | 7/2012 | Jang et al. |
| 2012/0188984 A1* | 7/2012 | Takahashi ......... H04W 36/0083 370/331 |
| 2012/0214512 A1 | 8/2012 | Siomina et al. |
| 2012/0315905 A1* | 12/2012 | Zhu ...................... H04W 36/36 455/436 |
| 2012/0329448 A1* | 12/2012 | Lim .......................... 455/422.1 |
| 2013/0021929 A1* | 1/2013 | Kim ..................... H04B 7/024 370/252 |
| 2013/0042304 A1* | 2/2013 | Rajavelsamy et al. ........... 726/3 |
| 2013/0065615 A1* | 3/2013 | Jeong .................... H04W 64/00 455/456.6 |
| 2013/0128865 A1* | 5/2013 | Wu ....................... H04W 36/00 370/331 |
| 2013/0137437 A1* | 5/2013 | Reddy ............... H04L 29/12009 455/437 |
| 2013/0336179 A1* | 12/2013 | Rubin ................ H04W 72/046 370/281 |
| 2014/0031041 A1* | 1/2014 | Jung .................... H04W 36/30 455/437 |
| 2014/0079022 A1* | 3/2014 | Wang ................... H04W 36/22 370/331 |
| 2014/0105180 A1* | 4/2014 | Grant .................. H04W 36/30 370/332 |
| 2014/0187247 A1* | 7/2014 | Sarkar .................. H04W 36/30 455/437 |
| 2014/0211756 A1* | 7/2014 | Bontu .................. H04W 36/04 370/331 |
| 2015/0017993 A1* | 1/2015 | Ishii .................. H04W 36/0011 455/444 |
| 2015/0079937 A1* | 3/2015 | Adachi ................. H04W 12/06 455/411 |
| 2015/0312811 A1* | 10/2015 | Lei et al. |
| 2016/0014666 A1* | 1/2016 | Muller .................. H04W 36/30 455/436 |

FOREIGN PATENT DOCUMENTS

| | | | |
|---|---|---|---|
| WO | 2009-074767 A1 | 6/2009 | |
| WO | WO 2013137460 A1 * | 9/2013 | ............ H04W 12/06 |

* cited by examiner

METHOD AND APPARATUS FOR PERFORMING HANDOVER IN WIRELESS COMMUNICATION SYSTEM

CROSS-REFERENCE TO RELATED APPLICATION(S)

This application claims the benefit under 35 U.S.C. § 119(a) of a Korean patent application filed on Apr. 11, 2013 in the Korean Intellectual Property Office and assigned Serial number 10-2013-0039852, the entire disclosure of which is hereby incorporated by reference.

TECHNICAL FIELD

The present disclosure relates to a method and apparatus for performing handover in a wireless communication system.

BACKGROUND

As wireless communication is widely used these days, traffic grows exponentially and demands of individual users for handling the increased traffic also grow. The higher the demand for handling the traffic is, the higher the bandwidth is, and high operating frequencies are required to use the high bandwidth. For this, a communication technology of a related art that uses ultra-high frequency spectrum (millimeter Wave or mmWave) has been proposed.

Signals of the ultra-high frequency band like the mmWave band have a Line of Sight (LOS) characteristic, and thus have a strong straightness and a weak transmittance. Accordingly, assuming that a user using the mmWave band has moved from outdoors to indoors, the user indoors may have difficulty performing communication using signals transmitted from an outdoor Base Station (BS). Thus, in the case of using the mmWave band, every room or every shadow area in which there are walls, humans, and electricity requires an apparatus for relaying the signal from the outdoor BS, e.g., a WiFi Access Point (AP). Thus, the communication technology has limits of being used only in a place where the WiFi AP is installed.

In the meantime, the WiFi technology does not suggest any handover scheme, and thus in a WiFi communication system, a User Equipment (UE) performs handover by scanning other APs, measuring Received Signal Strength Indication (RSSI) of a signal received from each scanned AP, and selecting an AP for handover from among the scanned other APs based on the respective RSSIs of the scanned APs.

However, since the UE may not know on which channel the other APs operate, the UE must scan all the channels for other APs and especially, active scanning requires many procedures as follows:

(1) The UE broadcasts a probe request message on an associated channel, (2) APs receiving the probe request message send probe response messages, and (3) The UE measures RSSI based on the probe response messages received from the APs.

The UE and APs may determine an AP for handover by performing the procedures (1) to (3), but the procedures (1) to (3) may increase handover time. Such an increase in handover time may cause packet losses and thus significant inconvenience for the user.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for performing handover in a wireless communication system.

Another aspect of the present disclosure is to provide a method and apparatus for performing handover between heterogeneous networks.

Another aspect of the present disclosure is to provide a method and apparatus for performing fast handover by performing authentication and association procedures in advance for handover.

In accordance with an aspect of the present disclosure, a method for performing handover between heterogeneous networks by a User Equipment (UE) in a wireless communication system is provided. The method includes periodically sending a first node a measurement report message while being provided a communication service from the first node using a first frequency band, the measurement report message including measurements for the first node and at least one other node using a different frequency band than the first frequency band, and exchanging information, required to perform handover to a second node having a greatest measurement among the at least one other node, with the second node if a handover preparation request message is received from the first node.

In accordance with another aspect of the present disclosure, a method for performing handover between heterogeneous networks by a first node that provides a communication service using a first frequency band in a wireless communication system is provided. The method includes receiving, from a UE provided the communication service from the first node, a measurement report message including measurements for the first node that uses the first frequency band and at least one other node using different frequency band than the first frequency band, and sending a handover preparation request message to the UE if a measurement of a second node that is the greatest among the at least one other node is greater than a threshold, wherein the handover preparation request message instructs the UE to exchange information, required to perform handover to the second node, with the second node.

In accordance with another aspect of the present disclosure, a method for performing handover between heterogeneous networks, of a first node that provides a communication service using a first frequency band in a wireless communication system, is provided. The method includes receiving from a UE to which the first node provides the communication service a first handover ready request message including an International Mobile Subscriber identity (IMSI) and an Internet Protocol (IP) address of the UE, sending the received first handover ready request message and an IP address of the first node to a server that manages the first node, and receiving a first handover ready response message as a response to the first handover ready request message from the server and sending the first handover ready response message to the UE.

In accordance with another aspect of the present disclosure, a UE for performing handover in a wireless communication system is provided. The UE includes a transceiver for periodically sending a first node a measurement report message while being provided a communication service from the first node using first frequency band, the measurement report message including measurements for the first node and at least one other node using different frequency band than the first frequency band, and exchanging information required to perform handover to a second node having a greatest measurement among the at least one other node with the second node if a handover preparation request message is received from the first node, and a controller for controlling operations of the transceiver.

In accordance with another aspect of the present disclosure, a first node for performing handover between heterogeneous networks in a wireless communication system is provided. The first node includes a transceiver configured to receive from a UE that is provided a communication service using a first frequency band, a measurement report message including measurements for the first node and at least one other node using a different frequency band than the first frequency band, and to send a handover preparation request message to the UE if a measurement of a second node that is the greatest among the at least one other node is greater than a threshold, and a controller configured to control operations of the transceiver, wherein the handover preparation request message instructs the UE to exchange information required to perform handover to the second node with the second node.

In accordance with another aspect of the present disclosure, a first node for performing handover between heterogeneous networks in a wireless communication system is provided. The first node includes a transceiver configured to receive, from a UE to which the first node provides the communication service using a first frequency band, a first handover ready request message including an IMSI and an IP address of the UE, to send the received first handover ready request message and an IP address of the first node to a server that manages the first node, to receive a first handover ready response message, as a response to the first handover ready request message, from the server, and to send the first handover ready response message to the UE, and a controller configured to control operations of the transceiver.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
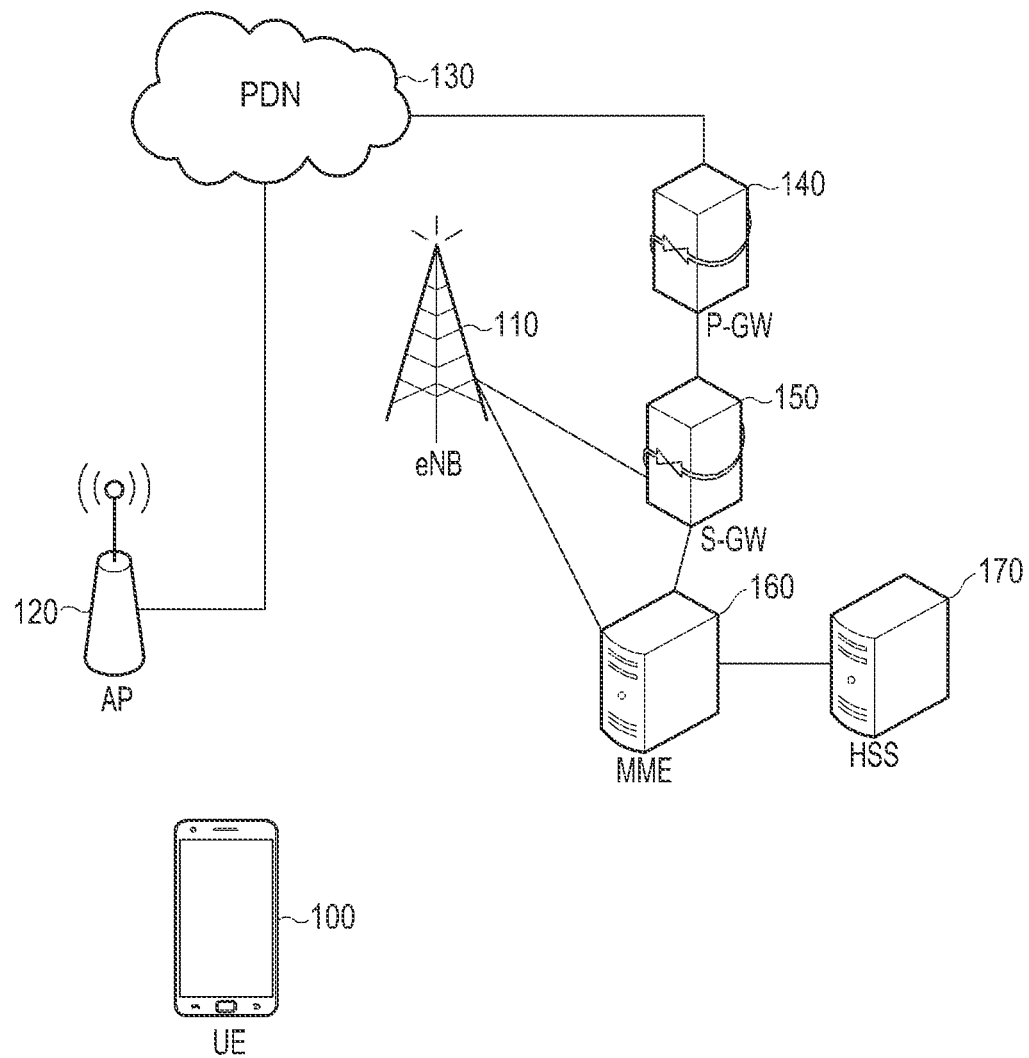
FIG. 1 illustrates a wireless communication system according to an embodiment of the present disclosure.

FIG. 1 illustrates a wireless communication system according to an embodiment of the present disclosure.

Referring to FIG. 1, it is assumed for this example that the wireless communication system is e.g., an Evolved Packet System (EPS) evolved from a Long Term Evolution (LTE)

system. The wireless communication system may include User Equipment (UE) 100, evolved Node B (eNB) 110, Access Point (AP) 120, Packet Data Network (PDN) 130, PDN gateway 140, Serving Gateway (S-GW) 150, Mobility Management Entity (MME) 160 and Home Subscriber Server (HSS) 170.

The UE 100 may have a Universal Subscriber Identity Module (USIM) card that stores subscriber identity information, and the AP 120 may enable the UE 100 located in a shadow area to be provided communication services over a WiFi network. The PDN 130 may refer to a general Internet Protocol (IP) network, and the P-GW 140 is a gateway for connecting the PDN 130 and a Long Term Evolution (LTE) network and may serve to assign an IP to the UE 100. The S-GW 150 may serve as a gateway for connecting the P-GW 140 and the eNB 110.

The MME 160 may manage contexts and sessions of the UE 100, and the HSS 170 may store location information of the UE 100 for performing handover. The HSS 170 may have authentication key information and subscriber profiles for subscribers, and the subscriber profile may include information about a Quality of Service (QoS) level fit for a service product the subscriber subscribes to, e.g., priority information and information regarding maximum available bandwidth. When the UE 100 makes an access to an LTE network, the HSS 170 may send the authentication key information and the subscriber profile to the MME 160.

Figure 2:
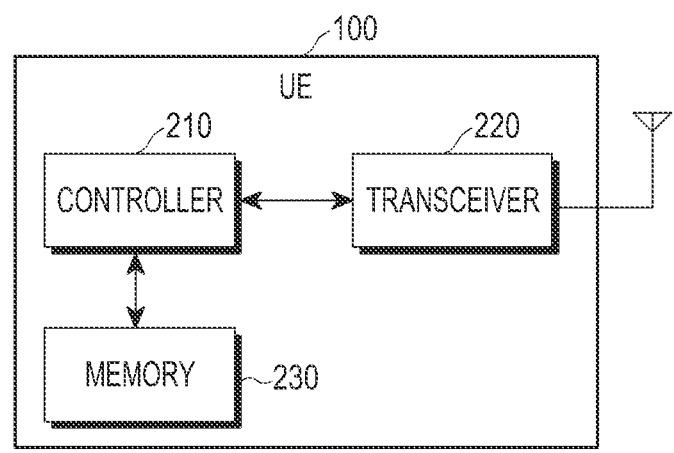
FIG. 2 is a block diagram of a User Equipment (UE) in a wireless communication system according to an embodiment of the present disclosure.

FIG. 2 is a block diagram of a UE in a wireless communication system according to an embodiment of the present disclosure.

Referring to FIG. 2, the UE 100 may include a controller 210, a transceiver 220, and a memory 230.

The controller 210 may refer to a general Central Processing Unit (CPU), which may be an Application Processor, and include a chip having computing parts and associated functions to implement software instructions. The controller 210 may control overall operations of the UE 100 by controlling the transceiver 220 and the memory 230. More particularly, the controller 210 may perform handover operations in accordance with an embodiment of the present disclosure.

The transceiver 220 may be responsible for wireless communication of the UE 100, and may include an mmWave modem, a WiFi module, a BLUETOOTH module, and a Near Field Communication (NFC) module, although not shown. The mmWave modem refers to a modem that uses the mmWave band to provide communication services, and the WiFi module refers to a module that uses an Institute of Electrical and Electronics Engineers (IEEE) 802.11 Wireless Local Area Network (WLAN) standard to provide communication services. The BLUETOOTH module refers to a module that uses the 2.4 GHz band for communication services. For example, if the WiFi module uses the same 2.4 GHz band as used by the BLUETOOTH module, the WiFi module and the BLUETOOTH module may share an antenna. Otherwise, if the WiFi module uses a 5 GHz band different from that of the BLUETOOTH module, the WiFi module may use an additional antenna dedicated for the WiFi module.

The memory 230 is a storage device for temporarily or permanently storing information regarding operations of the UE 100. For example, the memory 230 may store information measured and obtained by scanning an eNB and an AP, and store a beam IDentifier (ID), a sector ID, and a cell ID received from the eNB, Received Signal Strength Indication (RSSI) information received from the AP, an IP address of the AP, a Service Set ID (SSID), etc.

Figure 3:
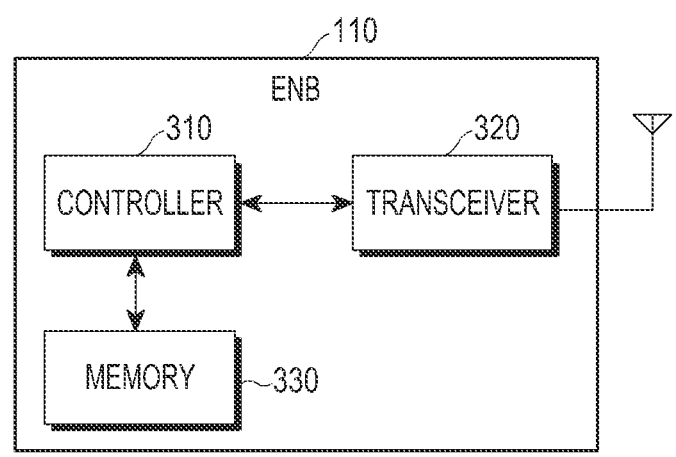
FIG. 3 is a block diagram of an evolved Node B (eNB) in a wireless communication system according to an embodiment of the present disclosure.

FIG. 3 is a block diagram of an eNB in a wireless communication system according to an embodiment of the present disclosure.

Referring to FIG. 3, the eNB 110 may include a controller 310, a transceiver 320, and a memory 330.

The controller 310 may control overall operations of the eNB 110 by controlling the transceiver 320 and the memory 330. For example, the controller 310 may control the transceiver 320 to send a message to a UE, e.g., the UE 100, and control the transceiver 320 to stop sending DownLink (DL) data or continue sending the DL data in response to information about the message received from the UE. The controller 310 may compare the information about the received message with information stored in the memory 330, and in particular, perform handover in accordance with an embodiment of the present disclosure.

The transceiver 320 is responsible for wireless communication with the UE 100, and exchanges data and messages with the UE 100 under control of the controller 310.

The memory 330 is a storage device for temporarily or permanently storing information regarding operations of the eNB 110. For example, the memory 330 may store message information and an International Mobile Subscriber Identity (IMSI) as a unique ID of the UE 100, received from the UE 100.

In the following various embodiments of the present disclosure, a handover scheme of a UE will be described and the handover scheme may be divided into a handover scheme for a case where the UE has moved to indoors from outdoors while performing communication using the mmWave band and a handover scheme for a case where the UE has moved to the outdoors from the indoors while performing communication using the mmWave band.

Further, in the following various embodiments, each handover scheme may be described by largely dividing the handover scheme into a preparation procedure and an execution procedure. As an example, Vertical Handover (VHO) between heterogeneous networks, e.g., an LTE network and a WiFi network, will be described.

Figure 4:
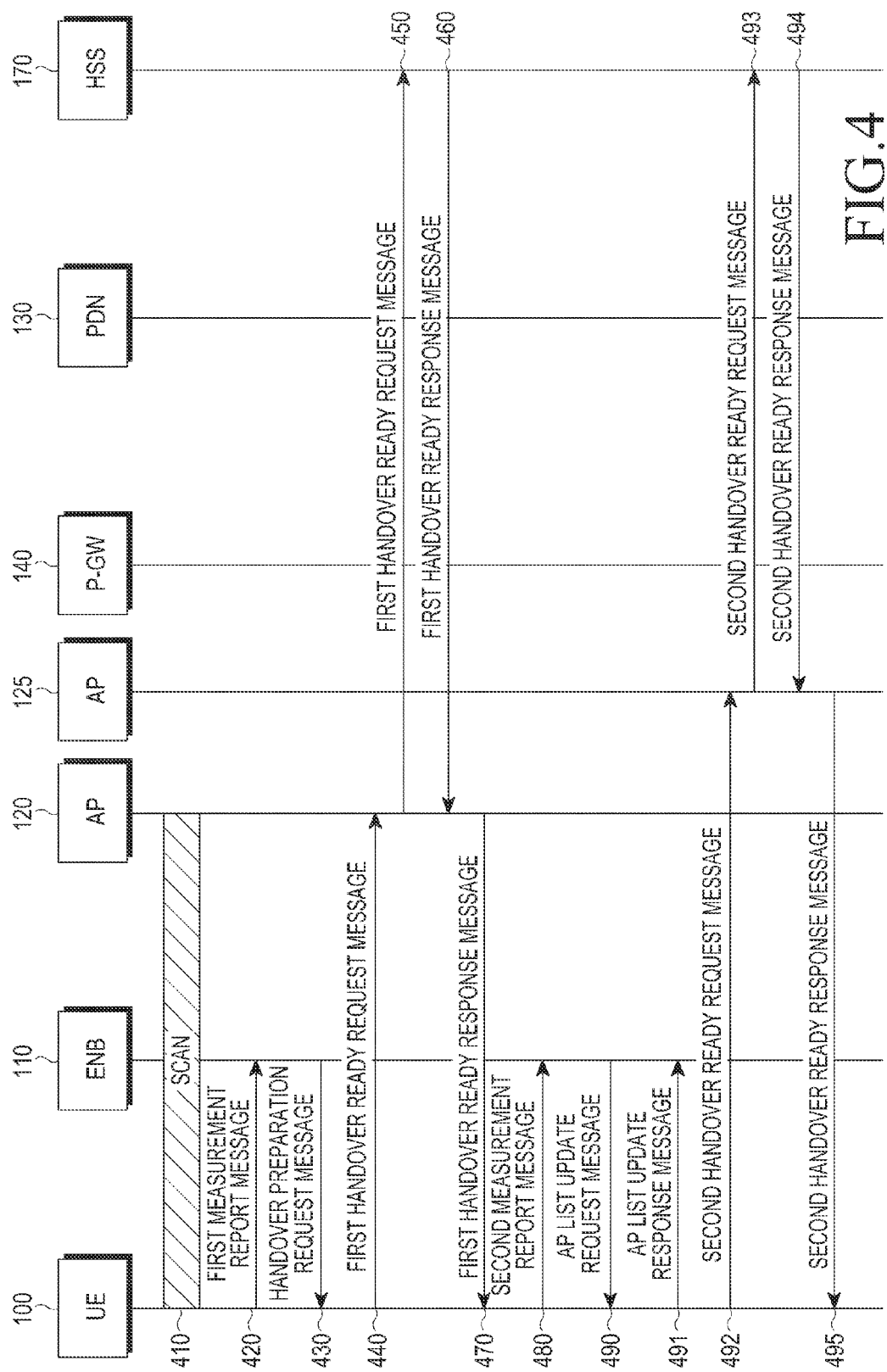
FIG. 4 is signal flow illustrating a procedure of preparing handover in a wireless communication system according to an embodiment of the present disclosure.

FIG. 4 is signal flow illustrating a procedure of preparing handover in a wireless communication system according to an embodiment of the present disclosure.

It is assumed for this example that the handover preparation procedure of FIG. 4 may occur when the UE moves from outdoors to indoors.

Referring to FIG. 4, the wireless communication system may include the UE 100, the eNB 110, APs 120 and 125, the P-GW 140, the PDN 130, and the HSS 170. In operation 410, the UE 100 may measure information regarding the eNB 110 and at least one AP, e.g., the APs 120 and 125, through periodic scanning. The at least one AP may be at least one of handover candidate APs included in a handover candidate AP list managed by the UE 100.

In operation 420, the UE 100 may send the eNB 110 a first measurement report message including the measurement results. The first measurement report message may be periodically sent to the eNB 110, and include, for example, RSSI of a signal received from each of the at least one AP and the eNB 110, an IP address of the at least one AP, SSID, IMSI and IP address of the UE 100, and a beam ID, a sector ID, and a cell ID of a signal received from the eNB 110. The first measurement report message may also include information regarding an AP among the APs included in the handover candidate AP list, which sent a signal having the greatest RSSI. It is assumed for this example that the AP that sent a signal having the greatest RSSI is the AP 120.

The eNB 110 may detect a target AP, i.e., the AP 120, to which the UE 100 performs handover, based on information included in the first measurement report message. For example, if the first measurement report message includes information about the AP 120 that sent a signal having the greatest RSSI, the eNB 110 may detect the AP 120 directly from the information. Otherwise, if the first measurement report message does not include information about the AP 120 that sent a signal having the greatest RSSI, the eNB 110 may measure the RSSI of a signal received from each of the at least one AP through scanning and detect the AP 120 based on the RSSIs.

Once the eNB 110 detects the AP 120, in operation 430 the eNB 110 may send a handover preparation request (HO_Preparation_Req) message to the EU 100. The purpose of sending the handover preparation request message is to proceed with authentication and association procedures for the handover of the UE 100 from the eNB 110 to the AP 120.

Upon reception of the handover preparation request message, in operation 440 the UE 100 may send the AP 120 a first handover ready request (HO_Ready_Req) message to proceed with authentication and association procedures with the AP 120. After this, the UE 100 may proceed with the authentication and association procedures with the AP 120. The first handover ready request message may include an IMSI and an IP address of the UE 100 having been used in an outdoor network, e.g., an LTE network.

In operation 450, the AP 120 may send the first handover ready request message to the HSS 170. Here, the first handover ready request message may include the IMSI and IP address of the UE 100 and an IP address of the AP 120. In other words, the first handover ready request sent from the AP 120 to the HSS 170 may additionally include the IP address of the AP 120 as compared with the first handover ready request sent from the UE 100.

Upon reception of the first handover ready request, the HSS 170 may store information included in the first handover ready request, i.e., the IMSI and IP address of the UE 100 and the IP address of the AP 120. In operation 460, the HSS 170 may send a first handover ready response (HO_Ready_Res) message to the AP 120 as a response to the first handover ready request. Here, the first handover ready response message may include the IMSI and IP address of the UE 100 and the IP address of the AP 120.

Upon reception of the first handover ready response message, in operation 470 the AP 120 may inform the UE 100 that the handover is ready by sending the first handover ready response message to the UE 100. The UE 100 may then determine whether handover is necessary at the moment when the first handover ready response message has just received, and if determining that handover is not necessary, in operation 480 the UE 100 may send a second measurement report message to the eNB 110. The second measurement report message may include similar information to that included in the first measurement report message as discussed above, but the RSSI of a signal received from each of the eNB 110 and the at least one AP, the IP address of the at least one AP, the SSID, and the beam ID, sector ID, and cell ID of a signal received from the eNB 110 may be the same as those included in the first measurement report message, or may have updated values.

Having detected that at least one of the sector ID, beam ID, and cell ID has been changed based on the information included in the second measurement report message, in operation 490 the eNB 110 may send the UE 100 an AP list update request message requesting to update the handover candidate AP list.

Upon reception of the AP list update request message, the UE 100 may update the handover candidate AP list, and, in operation 491, send the eNB 110 an AP list update response message that includes the updated handover candidate AP list.

The UE 100 may determine a target AP for handover based on the updated handover candidate AP list. If it is assumed for this example that an AP among APs included in the updated handover candidate AP list, which sent a signal having the greatest RSSI is the AP 125, in operation 492 the UE 100 may send the newly determined AP 125 a second handover ready request (HO_Ready_Req) message. The UE 100 may then proceed with the authentication and association procedures with the AP 125. The second handover ready request message may include an IMSI and an IP address of the UE 100 having been used in an outdoor network.

In operation 493, the AP 125 may send the second handover ready request message so that information about the AP may be updated. Here, the second handover ready request message may include the IMSI and IP address of the UE 100 and an IP address of the AP 125.

Upon reception of the second handover ready request, the HSS 170 may store the information included in the second handover ready request, i.e., the IMSI and IP address of the UE 100 and the IP address of the AP 125. In operation 494, the HSS 170 may send a second handover ready response message to the AP 125. Here, the second handover ready request message may include the IMSI and IP address of the UE 100 and the IP address of the AP 125.

Upon reception of the second handover ready response message, in operation 495 the AP 125 may inform the UE 100 that the handover is ready by sending the second handover ready response message to the UE 100.

In the embodiment, an occasion where a target AP for handover is updated from the old AP 120 to the new AP 125 has been described as an example. However, if a signal received from the AP 120 still has the greatest RSSI or the IP address of the AP 120 has not been changed, in operation 491, the UE 100 may send the eNB 110 an AP list update response message including the old handover candidate AP list and operations 492 to 495 may not be performed.

Figure 5:
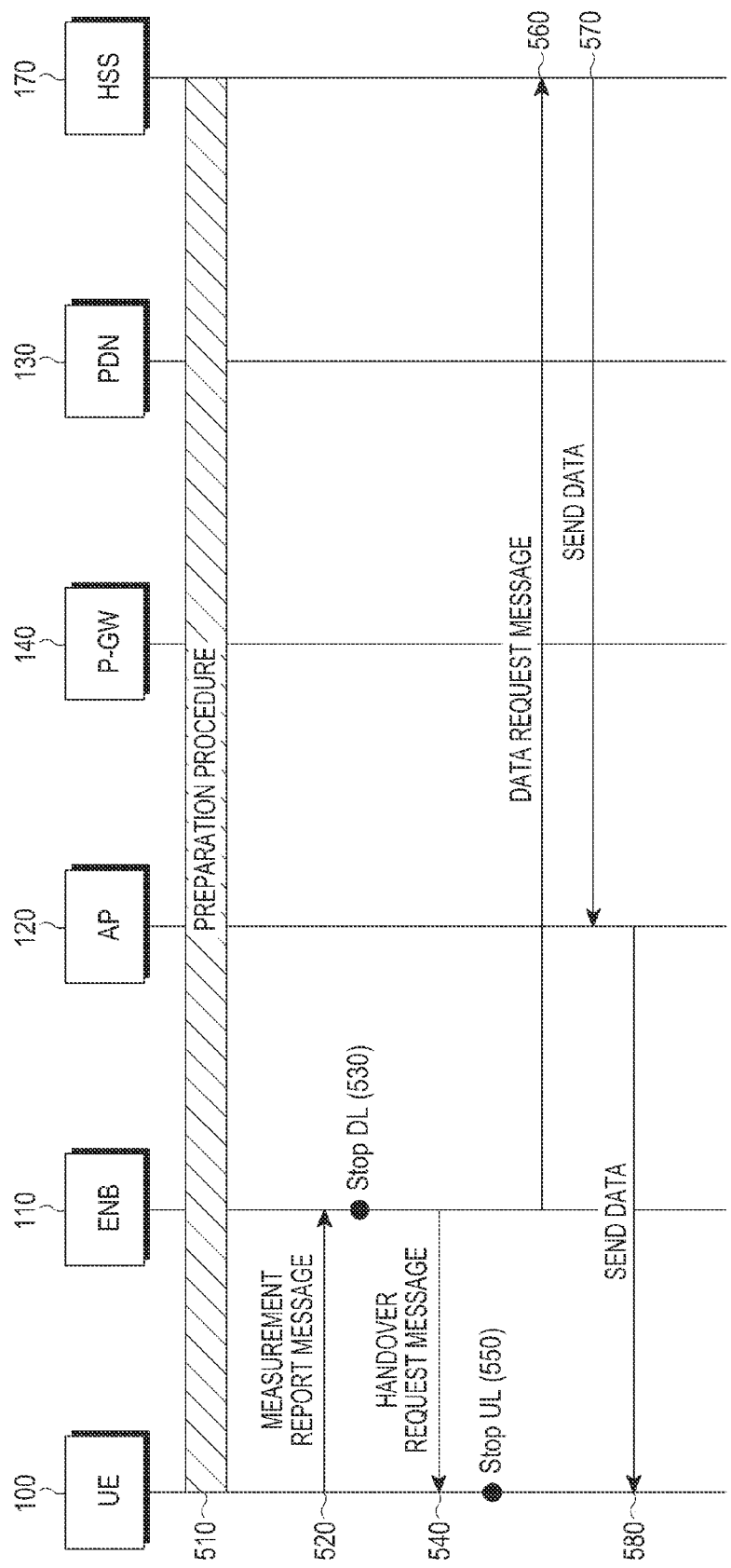
FIG. 5 is signal flow illustrating a procedure of executing handover in a wireless communication system according to an embodiment of the present disclosure.

FIG. 5 is signal flow illustrating a procedure of performing handover in a wireless communication system according to an embodiment of the present disclosure.

It is assumed for this example that an eNB, e.g., the eNB 110, is a main body which determines to perform handover when a UE, e.g., the UE 100, moves from outdoors to indoors. The embodiment of FIG. 5 is performed after completion of the handover preparation procedure. Description of the handover preparation procedure, represented by 510, will be omitted because it has been described in connection with FIG. 4.

Referring to FIG. 5, the wireless communication system may include the UE 100, the eNB 110, the AP 120, the P-GW 140, the PDN 130, and the HSS 170. After completion of the handover preparation procedure 510, the UE 110 may determine whether handover to the AP 120 is necessary. If determining that handover is not necessary, in operation 520 the UE 110 may send a measurement report message to the eNB 110. The measurement report message may be periodically sent to the eNB 110, and include the RSSI of a signal received from each of at least one AP and the eNB 110, an IP address of the at least one AP, an SSID, an IMSI of the UE 100, and a beam ID, a sector ID, and a cell ID of a signal received from the eNB 110.

Upon reception of the measurement report message, the eNB 110 may determine whether handover of the UE 100 to the AP 120 is necessary based on the measurement report message. If determining that handover of the UE 100 to the AP is necessary, in operation 530 the eNB 110 may stop sending DL data to the UE 100.

In operation 540, the eNB 110 may then send a handover request message instructing the UE 100 to perform handover from the eNB 110 to the AP 120. Upon reception of the handover request message, in operation 550 the UE 100 may stop sending Uplink (UL) data to the eNB 110. Then the UE 100 may enter a standby state until receiving DL data from the AP 120.

In operation 560, the eNB 110 may send a data request message to the HSS 170 such that data transmission to the UE 100 may be performed from the AP 120. In operation 570, the HSS 170 may send data to the AP 120 using the IP address of the AP 120 which has been stored in the HSS 170 in the handover preparation procedure 510. In operation 580, the AP 120 may send the UE 100 the data received in operation 570.

Figure 6:
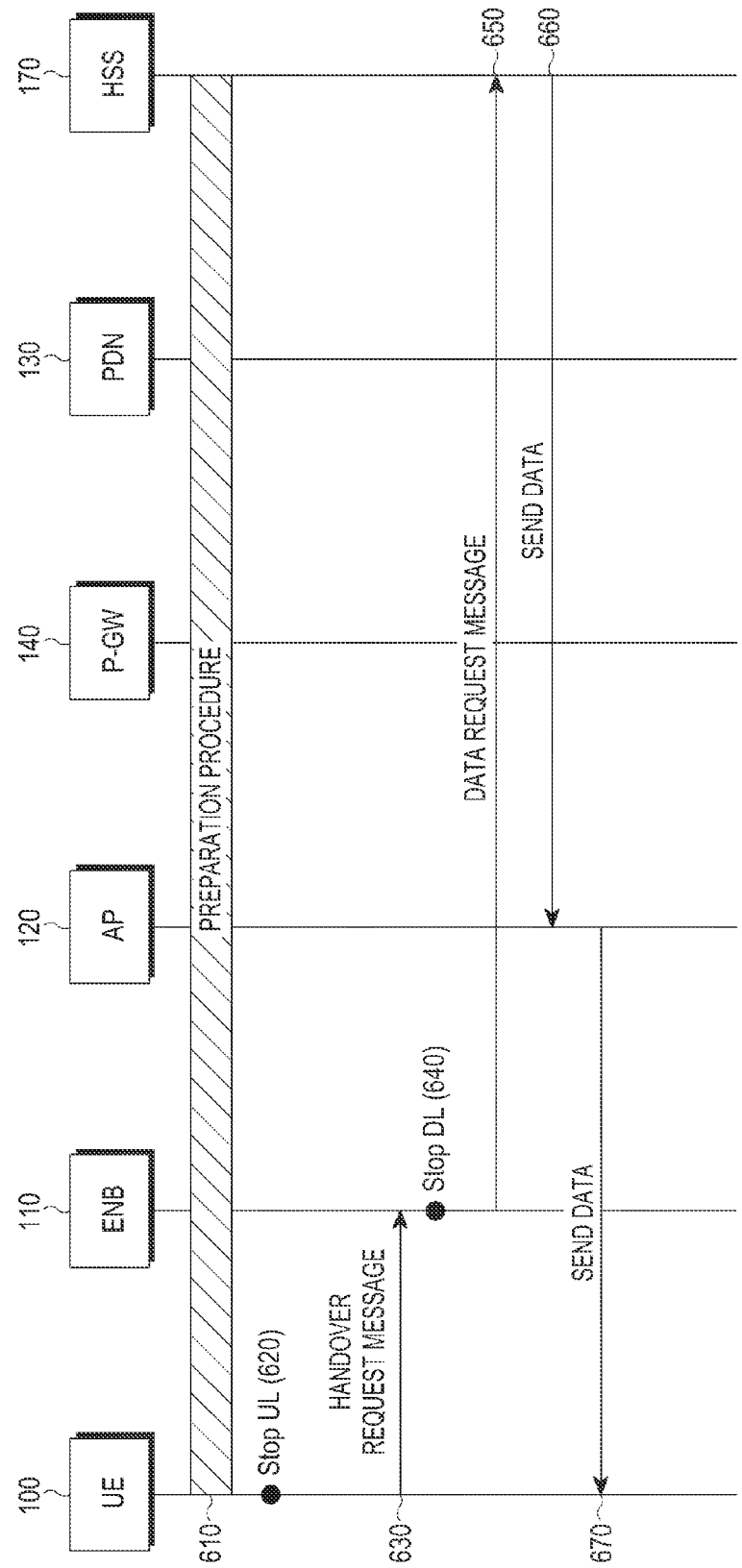
FIG. 6 is signal flow illustrating a procedure of performing handover in a wireless communication system according to another embodiment of the present disclosure.

FIG. 6 is signal flow illustrating a procedure of performing handover in a wireless communication system according to another embodiment of the present disclosure.

It is assumed for this example that a UE, e.g., the UE 100, is a main body which determines to perform handover when the UE moves from outdoors to indoors. The embodiment of FIG. 6 is performed after completion of the handover preparation procedure. Description of the handover preparation procedure, represented by 610, will be omitted because it has been described in connection with FIG. 4.

Referring to FIG. 6, the wireless communication system may include the UE 100, the eNB 110, the AP 120, the P-GW 140, the PDN 130, and the HSS 170. After completion of the handover preparation procedure 610, the UE 110 may determine whether handover to the AP 120 is necessary. If determining that handover is necessary, in operation 620 the UE 100 may stop sending UpLink (UL) data to the eNB 110.

In operation 630, the UE 100 may send the eNB 110 a handover request message to request handover to the AP 120. Upon reception of the handover request message, in operation 640 the eNB 110 may stop sending DL data to the UE 100.

In operation 650, the eNB 110 may send a data request message to the HSS 170 such that data transmission to the UE 100 may be performed from the AP 120. In operation 660, the HSS 170 may send data to the AP 120 using an IP address of the AP 120 which has been stored in the HSS 170 in the handover preparation procedure 610. In operation 670, the AP 120 may send the UE 100 the data received from HSS 170 in operation 660.

Figure 7:
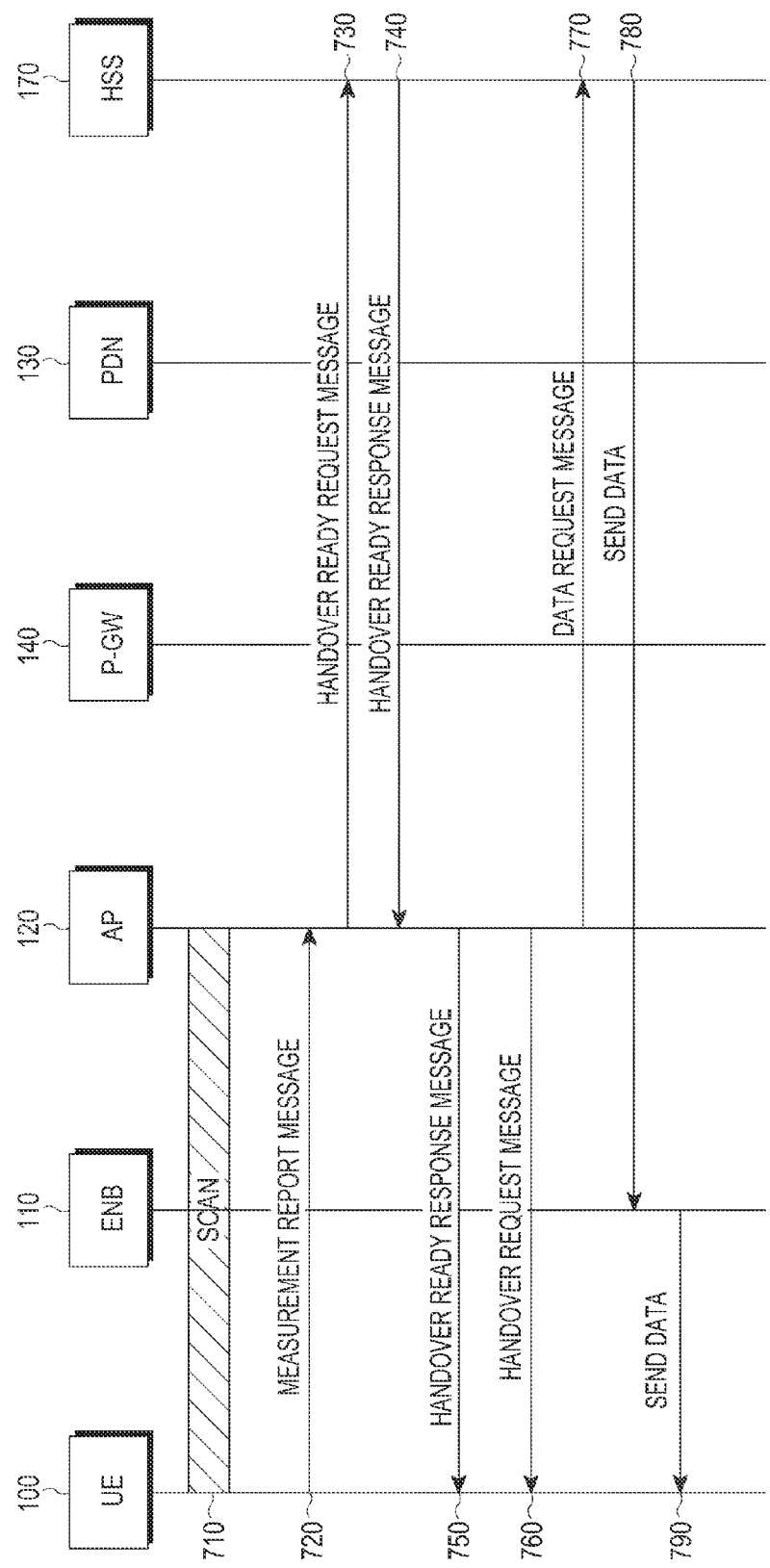
FIG. 7 is signal flow illustrating a procedure of performing handover in a wireless communication system according to another embodiment of the present disclosure.

FIG. 7 is signal flow illustrating a procedure of performing handover in a wireless communication system according to another embodiment of the present disclosure.

It is assumed for this example that an AP, e.g., the AP 120, is a main body which determines to perform handover when the UE moves from indoors to outdoors. Subsequent to the handover execution procedure described in connection with FIGS. 5 and 6, the embodiment of FIG. 7 may be performed.

Referring to FIG. 7, the wireless communication system may include the UE 100, the eNB 110, the AP 120, the P-GW 140, the PDN 130, and the HSS 170. In operation 710, the UE 100 may measure information about at least one eNB and the AP 120 through periodic scanning. In operation 720, the UE 100 may send a measurement report message to the AP 120. The measurement report message may be periodically sent to the AP 120, and include the RSSI of a signal received from each of the at least one eNB and the AP 120, an IP address of the at least one eNB, SSID, IMSI of the UE 100, and a beam ID, a sector ID, and a cell ID of a signal received from the at least one eNB. The measurement report message may also include information about an eNB that sent a signal having the greatest RSSI. It is assumed for this example that the eNB that sent a signal having the greatest RSSI is the eNB 110.

The AP 120 may detect a target eNB for handover of the UE 100 based on the information included in the measurement report message, i.e., the information about the eNB that sent a signal having the greatest RSSI. It is assumed for this example that the measurement information message includes information about the eNB 110, which is a target eNB for handover. However, if the measurement report message does not include information about the eNB 110, the AP 120 may measure the RSSI of a signal received from each of the at least one eNB through scanning and detect the eNB 110 based on the RSSIs.

The AP 120 that has detected the eNB 110 may perform the handover preparation procedure with the HSS 170 to enable the UE 110 to perform handover to the eNB 110. Specifically, in operation 730, the AP 120 may send a handover ready request (HO_Ready_Req) message to the HSS 170. The handover ready request message may include an IMSI and IP address of the UE 100, and an IP address of the eNB 110, and the information included in the handover ready request message may be stored in the HSS 170.

In operation 740, the HSS 170 may send the AP 120 a handover ready response (HO_Ready_Res) message as a response to the handover ready request. Here, the handover ready request message may include the IMSI and IP address of the UE 100 and the IP address of the eNB 110.

Upon reception of the handover ready response message, in operation 750 the AP 120 may inform the UE 100 that the handover is ready by sending the handover ready response message to the UE 100. The AP 120 may compare its own RSSI with RSSI of the eNB 110. If the RSSI of the eNB 110 is greater than its own RSSI, in operation 760 the AP 120 may send the UE 100 a handover request message instructing the UE 100 to perform handover to the eNB 110.

In operation 770, the AP 120 may send a data request message to the HSS 170 such that data transmission to the UE 100 may be performed from the eNB 110. In operation 780, the HSS 170 may send data to the eNB 110 using the IP address of the AP 110 which has been stored in the HSS 170 in operation 730. In operation 790, the eNB 110 may send the UE 100 the data received from HSS 170 in operation 780.

Figure 8:
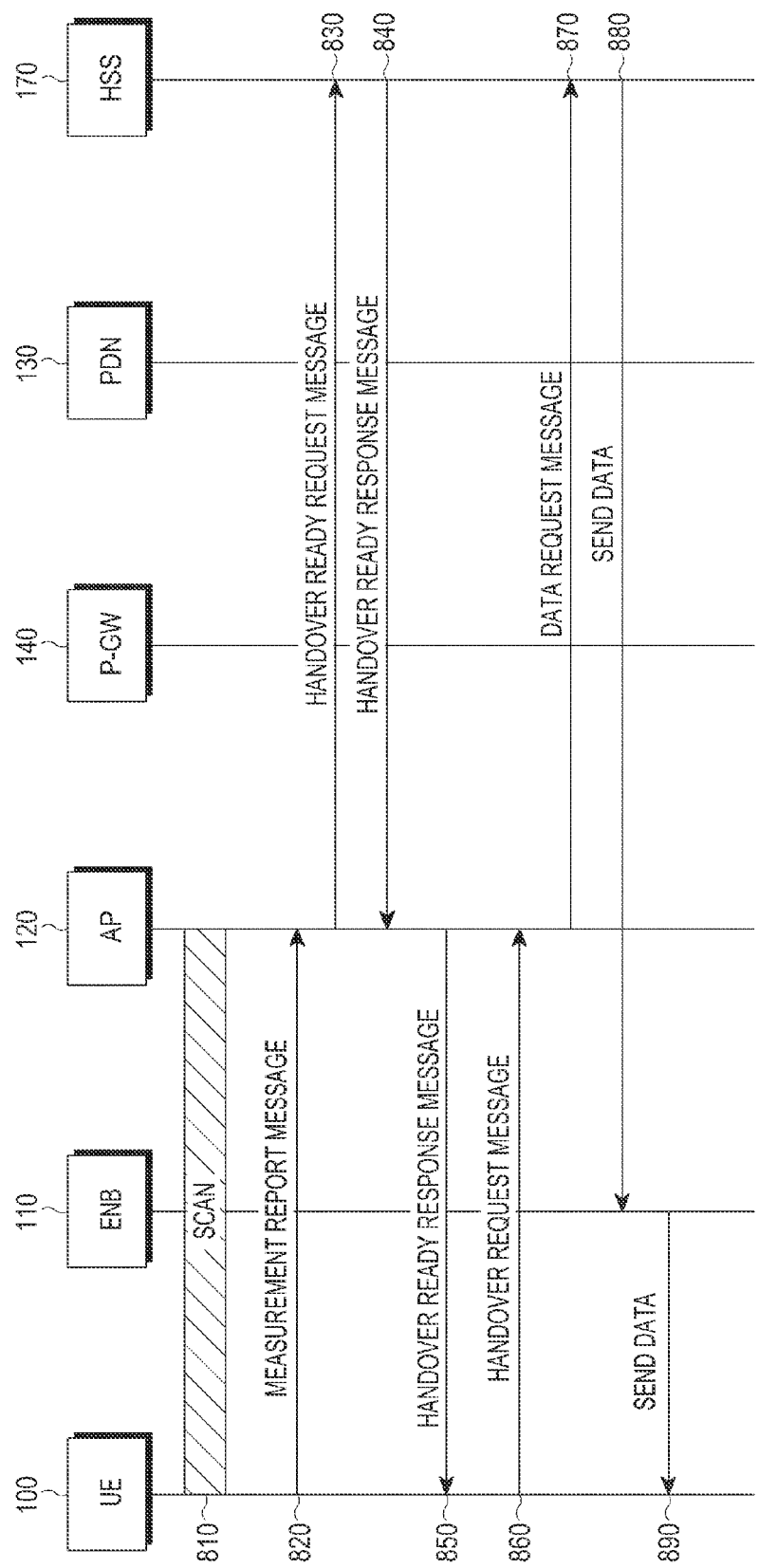
FIG. 8 is signal flow illustrating a procedure of performing handover in a wireless communication system according to another embodiment of the present disclosure.

FIG. 8 is signal flow illustrating a procedure of performing handover in a wireless communication system according to another embodiment of the present disclosure.

It is assumed for this example that a UE, e.g., the UE 100, is a main body which determines to perform handover when the UE 100 moves from indoors to outdoors. Subsequent to the handover execution procedure described in connection with FIGS. 5 and 6, the embodiment of FIG. 8 may be performed.

Referring to FIG. 8, the wireless communication system may include the UE 100, the eNB 110, the AP 120, the P-GW 140, the PDN 130, and the HSS 170. In operation 810, the UE 100 may measure information about at least one eNB and the AP 120 through periodic scanning. In operation 820, the UE 100 may send a measurement report message to the AP 120. The measurement report message may be periodically sent to the AP 120, and include the RSSI of a signal received from each of the at least one eNB and the AP 120, an IP address of the at least one eNB, SSID, IMSI of the UE 100, and a beam ID, a sector ID, and a cell ID of a signal received from the at least one eNB. The measurement report message may also include information about an eNB among the at least one eNB, which sent a signal having the greatest RSSI. It is assumed for this example that the eNB that sent a signal having the greatest RSSI is the eNB 110.

The AP 120 may detect a target eNB for handover of the UE 100 based on the information included in the measurement report message, i.e., the information about the eNB that sent a signal having the greatest RSSI. It is assumed for this example that the measurement information message includes information about the eNB 110, which is a target eNB for handover. However, if the measurement report message does not include information about the eNB 110, the AP 120 may measure the RSSI of a signal received from each of the at least one eNB through scanning and detect the eNB 110 based on the RSSIs.

The AP 120 that has detected the eNB 110 may perform the handover preparation procedure with the HSS 170 to enable the UE 110 to perform handover to the eNB 110. More specifically, in operation 830, the AP 120 may send a handover ready request (HO_Ready_Req) message to the HSS 170. The handover ready request message may include an IMSI and IP address of the UE 100, and an IP address of the eNB 110, and the information included in the handover ready request message may be stored in the HSS 170.

In operation 840, the HSS 170 may send the AP 120 a handover ready response (HO_Ready_Res) message as a response to the handover ready request. Here, the handover ready request message may include the IMSI and IP address of the UE 100 and the IP address of the eNB 110.

Upon reception of the handover ready response message, in operation 850 the AP 120 may inform the UE 100 that the handover is ready by sending the handover ready response message to the UE 100. The UE 100 may compare the RSSI of the AP 120 that are providing a current communication service with RSSI of the eNB 110. If the RSSI of the eNB 110 is greater than the RSSI of the AP 120, in operation 860 the UE 100 may send the AP 100 a handover request message requesting handover from the AP 120 to the eNB 120.

In operation 870, the AP 120 may send a data request message to the HSS 170 such that data transmission to the UE 100 may be performed from the eNB 110. In operation 880, the HSS 170 may send data to the eNB 110 using the IP address of the eNB 110 which has been stored in the HSS 170 in operation 830. In operation 890, the eNB 110 may send the UE 100 the data received from HSS 170 in operation 880.

Figure 9A:
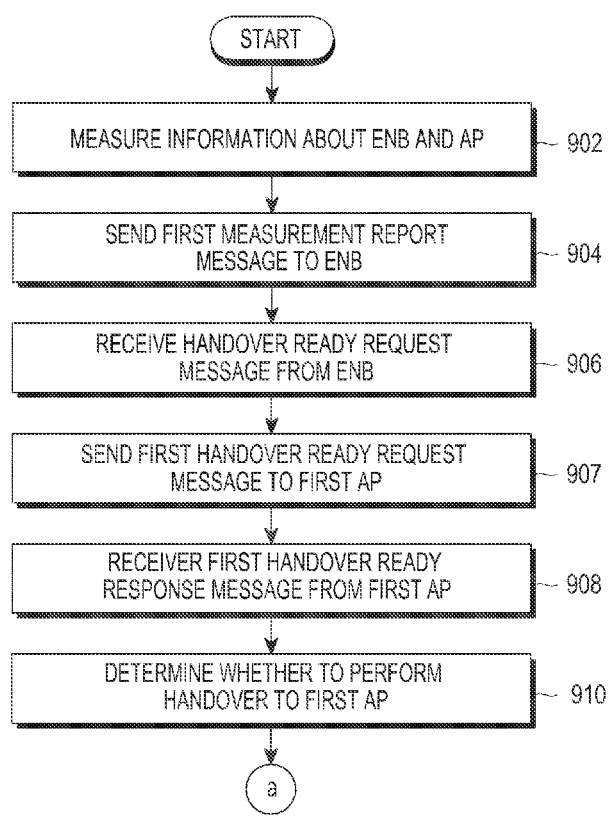
FIGS. 9A and 9B are a flowchart illustrating a procedure of preparing handover by a UE in a wireless communication system according to an embodiment of the present disclosure.
Figure 9B:
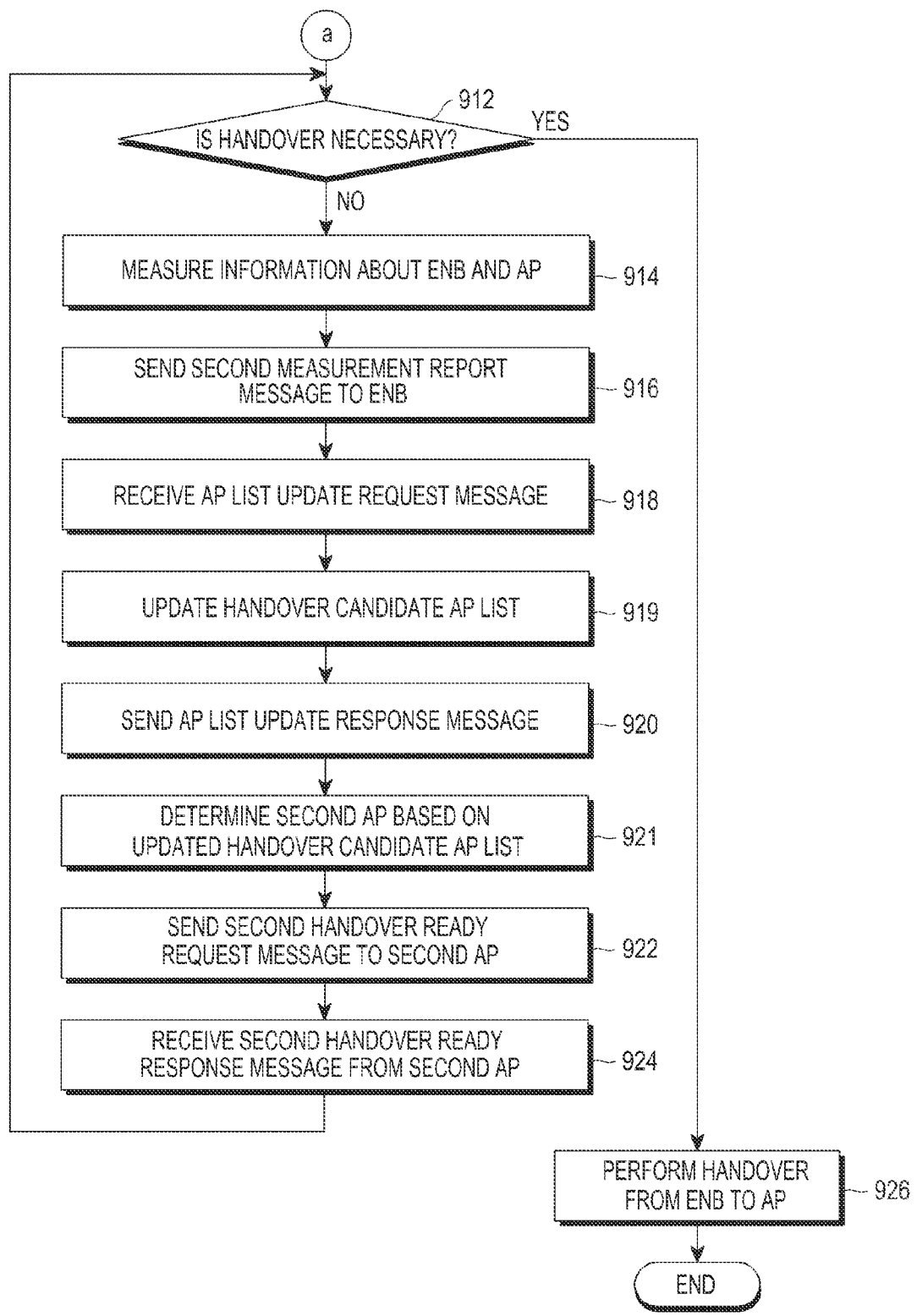

FIGS. 9A and 9B are a flowchart illustrating a procedure of preparing handover by a UE in a wireless communication system according to an embodiment of the present disclosure.

It is assumed for this example that the handover preparation procedure of FIGS. 9A and 9B may occur when the UE moves from outdoors to indoors.

Referring to FIGS. 9A and 9B, in operation 902, the UE, e.g., the UE 100, may measure information about an eNB and at least one AP through periodic scanning. The at least one AP may be at least one among APs included in a handover candidate AP list managed by the UE 100.

In operation 904, the UE 100 may send a first measurement report message to the eNB, e.g., the eNB 110. The first measurement report message may be periodically sent to the eNB 110, and include the RSSI of a signal received from each of at least one AP and the eNB 110, an IP address of the at least one AP, SSID, IMSI of the UE 100, and a beam ID, a sector ID, and a cell ID of a signal received from the eNB 110. The first measurement report message may also include information regarding a first AP that sent a signal having the greatest RSSI among the APS included in the handover candidate AP list.

In operation 906, the UE 100 may receive a handover ready request message from the eNB 110, and in operation 907, the UE 100 may send the first AP a first handover ready request message in order to proceed with authentication and association procedures with the first AP. The handover ready request message may include an IMSI and IP address of the UE 100.

In operation 908, the UE 100 may receive a first handover ready response message from the first AP as a response to the first handover ready request message. The first handover ready response message may indicate that handover is ready and include the IMSI and IP address of the UE 100 and the IP address of the first AP. In operation 910, the UE 100 may determine whether handover is necessary when the first handover ready response message is received.

If determining in operation 912 that handover is necessary, the UE 100 may proceed to operation 926 to perform handover from the eNB 110 to the first AP. Otherwise, if determining in operation 912 that handover is not necessary, in operation 914 the UE may measure information about the eNB 110 and at least one AP through periodic scanning. In operation 916, the UE 100 may send a second measurement report message to the eNB 110. The second measurement report message may include similar information to that included in the first measurement report message sent in operation 904, but the RSSI of a signal received from each of the at least one AP, IP address of the at least one AP, SSID, and beam ID, sector ID, and cell ID of a signal received from the eNB 110 may be the same as those included in the first measurement report message, or may have updated values.

In operation 918, the UE 100 may receive an AP list update request message requesting to update a handover candidate AP list. Upon reception of the AP list update request message, in operation 919 the UE 100 may update the handover candidate AP list, and in operation 920 send the eNB 110 an AP list update response message including the updated handover candidate AP list.

In operation 921, the UE 100 may determine a second AP that sent a signal having the greatest RSSI among APs included in the handover candidate AP list. In operation 922, the UE 100 may send the second AP a second handover ready request message. The second handover ready request message may include an IMSI and IP address of the UE 100.

In operation 924, the UE 100 may receive a second handover ready response message from the second AP as a response to the second handover ready request message. Here, the second handover ready response message may include the IMSI and IP address of the UE 100 and an IP address of the second AP. Then, the UE 100 may return to operation 912 to determine whether handover is necessary when the second handover ready response message is received. If determining that handover is necessary in operation 912, the UE 100 may proceed to operation 926 to perform handover from the eNB 110 to the second AP. Otherwise, if determining in operation 912 that handover is not necessary, in operation 914 the UE may measure information about the eNB 110 and at least one AP through periodic scanning.

In the embodiment of FIGS. 9A and 9B, it is assumed for this example that the second AP different from the first AP sent a signal having the greatest RSSI among APs included in the updated handover candidate AP list. Although not shown in FIG. 9B, in other various embodiments, the first AP may be determined to have sent a signal that has the greatest RSSI, in which case the first AP may replace the second AP in operation 921 and then the process may skip operations 922 and 924 and directly jump to operation 912.

Figure 10:
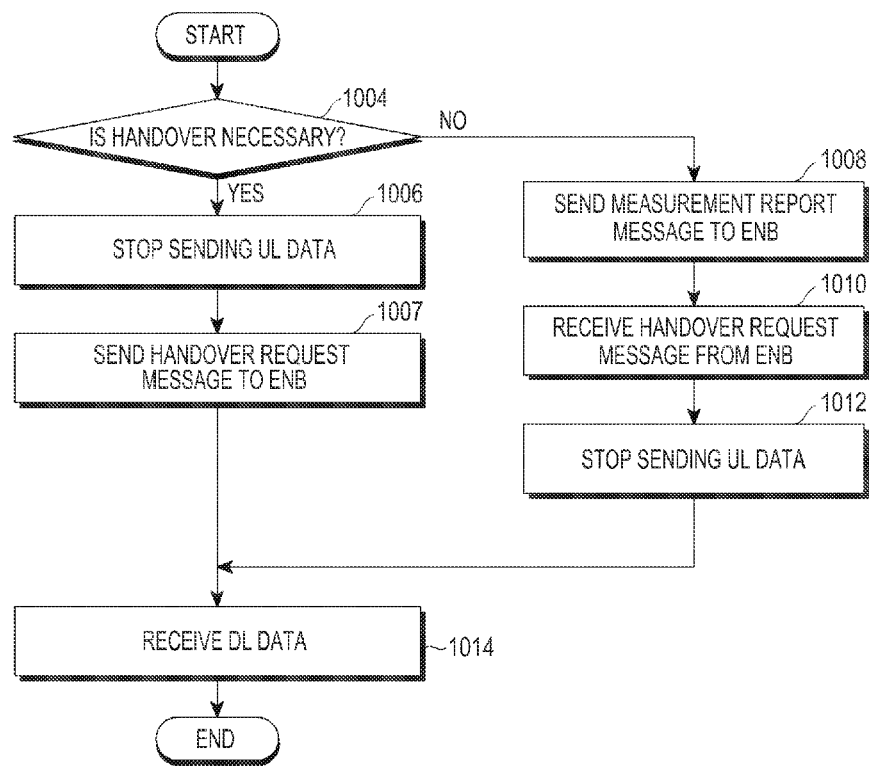
FIG. 10 is a flowchart illustrating a procedure of executing handover by a UE in a wireless communication system according to an embodiment of the present disclosure.

FIG. 10 is a flowchart illustrating a procedure of executing handover by a UE in a wireless communication system according to an embodiment of the present disclosure.

It is assumed for this example that a UE, e.g., the UE 100, is a main body which determines to perform handover when the UE moves from outdoors to indoors. The embodiment of FIG. 10 may be performed after completion of the handover preparation procedure as shown in FIGS. 9A and 9B.

Referring to FIG. 10, in operation 1004, the UE 100 may determine whether handover is necessary. If determining in operation 1004 that handover is necessary, in operation 1006, the UE 100 may stop sending UL data to an eNB, e.g., the eNB 110. In operation 1007, the UE 100 may send the eNB 110 a handover request message instructing handover to an AP.

In operation 1014, the UE 100 may receive DL data not from the eNB 110 but instead from the AP.

On the other hand, if determining in operation 1004 that handover is not necessary, the UE 100 may proceed to operation 1008 to send a measurement report message to the eNB 110. The measurement report message may be periodically sent to the eNB 110, and include the RSSI of a signal received from each of at least one AP and the eNB 110, an IP address of the at least one AP, SSID, IMSI of the UE 100, and a beam ID, a sector ID, and a cell ID of a signal received from the eNB 110.

The UE 100 may receive a handover request message from the eNB 110 that instructs handover from the eNB 110 to the AP in operation 1010, and may stop sending UL data to the eNB 110 in operation 1012. Then the UE 100 may enter a standby state until receiving DL data from the AP. In operation 1014, the UE 100 may receive DL data not from the eNB 110 but instead from the AP.

Figure 11A:
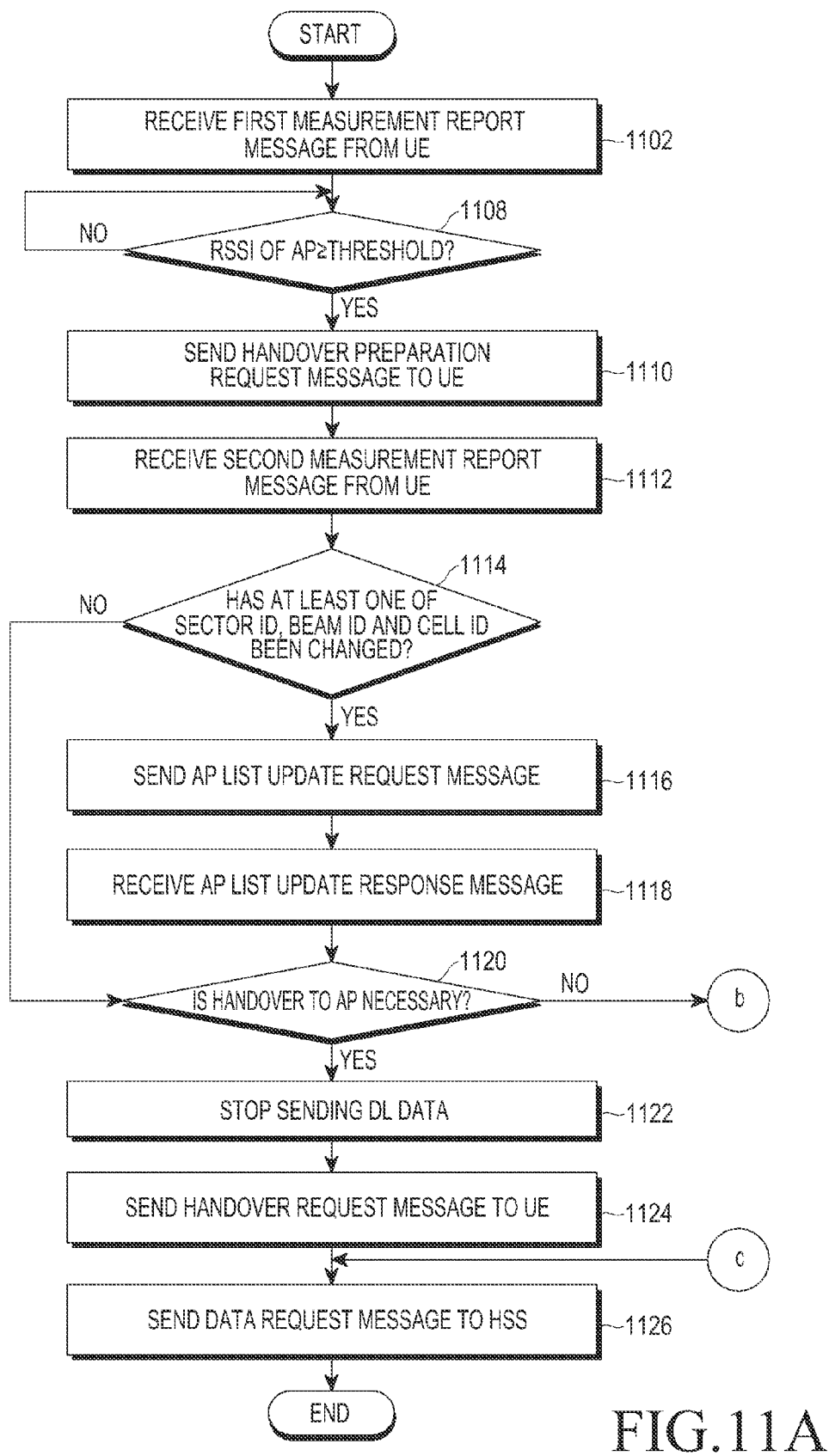
FIGS. 11A and 11B are a flowchart illustrating a procedure of performing handover by an eNB in a wireless communication system according to an embodiment of the present disclosure.
Figure 11B:
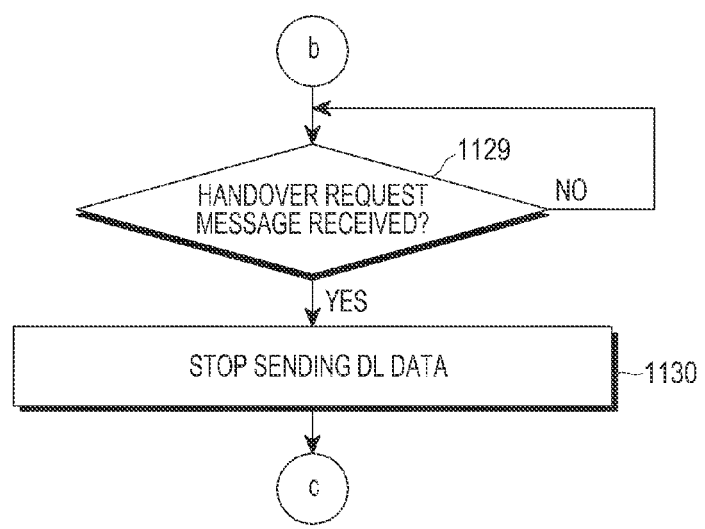

FIGS. 11A and 11B are a flowchart illustrating a procedure of performing handover by a eNB in a wireless communication system according to an embodiment of the present disclosure.

It is assumed for this example that the handover procedure of FIGS. 11A and 11B may occur when the UE moves from outdoors to indoors.

Referring to FIGS. 11A and 11B, in operation 1102, an eNB, e.g., the eNB 110, may receive a first measurement report message periodically sent from a UE, e.g., the UE 100. The first measurement report message may include the RSSI of a signal received from each of at least one AP and the eNB 110, an IP address of the at least one AP, SSID, IMSI which is a unique ID of the UE 100, and a beam ID, a sector ID, and a cell ID of a signal received from the eNB 110. The first measurement report message may also include information regarding a first AP that sent a signal having the greatest RSSI among the APs included in a handover candidate AP list managed by the UE 100.

In operation 1108, the eNB 110 may determine whether the RSSI of the AP is greater than a threshold based on the information included in the first measurement report message. If determining in operation in 1108 that the RSSI of the AP is not greater than the threshold, the eNB 110 may perform operation 1108 repeatedly, or otherwise if determining that the RSSI of the AP is greater than the threshold, the eNB 110 may proceed to operation 1110. In operation 1110, the eNB 110 may send a handover preparation request message to the UE 100. The handover preparation request message may enable the UE 100 to proceed with authentication and association with the AP.

In operation 1112, the eNB 110 may receive a second measurement report message periodically sent from the UE 100. The second measurement report message may include similar information to that included in the first measurement report message received in operation 1104, but the RSSI of a signal received from each of the at least one AP, IP address of the at least one AP, SSID, and beam ID, sector ID, and cell ID of a signal received from the eNB 110 may be the same as those included in the first measurement report message, or may have updated values.

In operation 1114, the eNB 110 may compare the sector ID, beam ID, or cell ID included in the first measurement report message with the sector ID, beam ID, or cell ID included in the second measurement report message and determine whether at least one of the sector ID, beam ID, and cell ID of the second measurement report message has been changed as compared with those included in the first measurement report message.

If determining in operation 1114 that at least one of the sector ID, beam ID, and cell ID included in the second measurement report message has not been changed as compared with those included in the first measurement report message, the eNB 110 may proceed to operation 1120 to determine whether handover of the UE 100 to the AP is necessary. If determining in operation 1114 that at least one of the sector ID, beam ID, and cell ID included in the second measurement report message has been changed as compared with those included in the first measurement report message, the eNB 110 may proceed to operation 1116 to send the UE 100 an AP list update request message requesting updates of a handover candidate AP list managed by the UE 100. In operation 1118, the eNB 110 may receive an AP list update response message that includes an updated handover candidate AP list from the UE 100.

In operation 1120, the eNB 110 may determine whether handover of the UE 100 to the AP is necessary.

If determining in operation 1120 that handover of the UE 100 to the AP is necessary, the eNB 110 may proceed to operation 1122 and stop sending DL data to the UE 100. In operation 1124, the eNB 110 may send the UE 100 a handover request message instructing the UE 100 to perform handover to the AP. In operation 1126, the eNB 110 may send a data request message to an HSS, e.g., the HSS 170, such that data transmission to the UE 100 may be performed from the AP.

On the other hand, if determining in operation 1120 that handover of the UE 100 to the AP is not necessary, the eNB 110 may proceed to operation 1129 to determine whether a handover request message is received from the UE 100. If the handover request message is not received from the UE 100 in operation 1129, the eNB 110 may perform operation 1129 repeatedly, or otherwise if the handover request message is received from the UE 100, the eNB 110 may proceed to operation 1130 and stop sending DL data to the UE 100. In operation 1126, the eNB 110 may send a data request message to the HSS 170 such that data transmission to the UE 100 may be performed from the AP.

Figure 12:
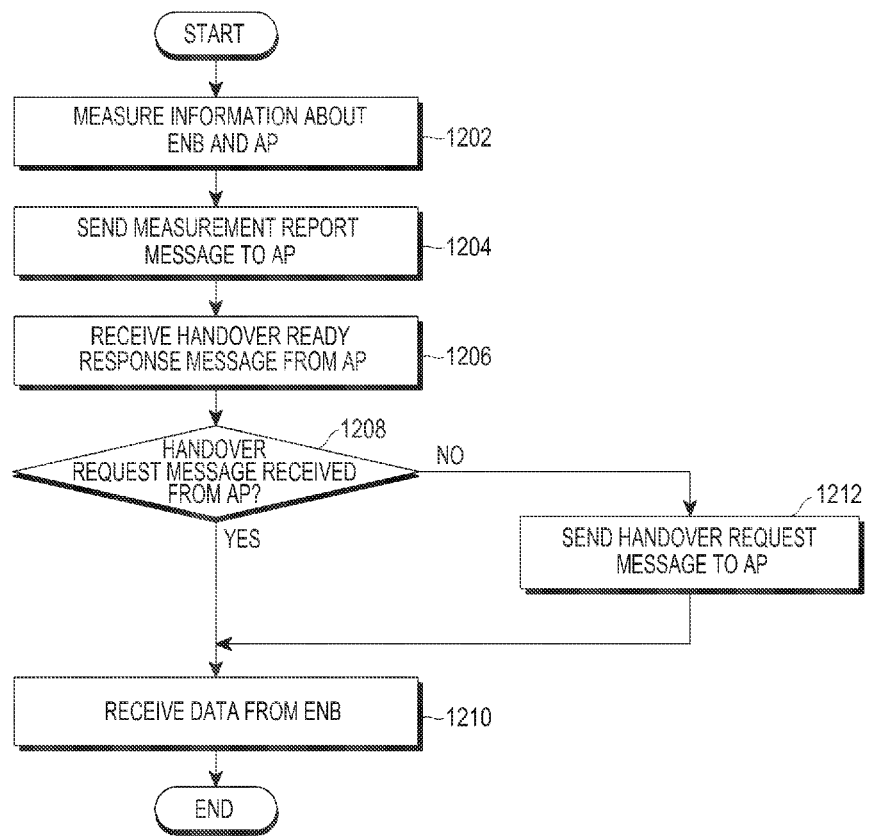
FIG. 12 is a flowchart illustrating a procedure of performing handover by a UE in a wireless communication system according to another embodiment of the present disclosure.

FIG. 12 is a flowchart illustrating a procedure of performing handover by a UE in a wireless communication system according to another embodiment of the present disclosure.

It is assumed for this example that the handover procedure of FIG. 12 may occur when the UE moves from indoors to outdoors.

Referring to FIG. 12, in operation 1202, the UE, e.g., the UE 100, may measure information about at least one eNB and an AP through periodic scanning. In operation 1204, the UE 100 may send a measurement report message to the AP. The measurement report message may be periodically sent to the AP 120, and include the RSSI of a signal received from each of the at least one eNB and the AP, an IP address of the at least one eNB, SSID, IMSI of the UE 100, and a beam ID, a sector ID, and a cell ID of a signal received from the at least one eNB. The measurement report message may also include information about an eNB among the at least one eNB, which sent a signal having the greatest RSSI.

In operation 1206, the UE 100 may receive a handover ready response message from the AP indicating that handover is ready. In operation 1208, the UE 100 may determine whether a handover request message instructing handover from the AP to the eNB is received from the AP. Upon reception of the handover request message from the AP in operation 1208, the UE 100 may proceed to operation 1210 to receive data sent from the eNB. However, if the handover request message is not received from the AP in operation 1208, the UE 100 may proceed to operation 1212 to send the AP a handover request message requesting handover from the AP to the eNB. In operation 1210, the UE 100 may receive data sent from the eNB.

Figure 13:
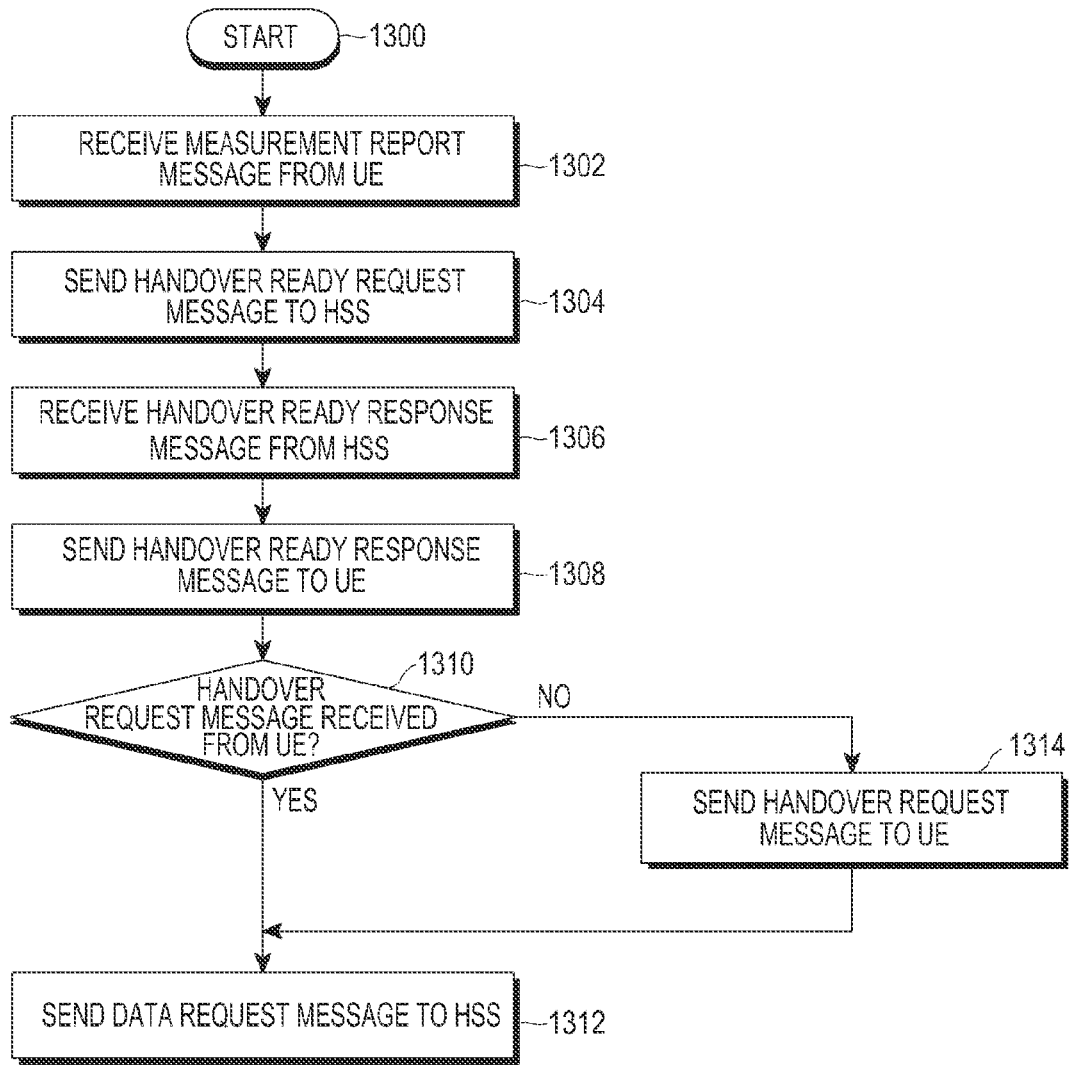
FIG. 13 is a flowchart illustrating a procedure of performing handover by an Access Point (AP) in a wireless communication system according to an embodiment of the present disclosure.

FIG. 13 is a flowchart illustrating a procedure of performing handover by an AP in a wireless communication system according to another embodiment of the present disclosure.

It is assumed for this example that the handover procedure of FIG. 13 may occur when a UE, e.g., the UE 100, moves from indoors to outdoors.

Referring to FIG. 13, in operation 1302, the AP may receive a measurement report message from the UE 100. The measurement report message may be periodically received from the UE 100, and include the RSSI of a signal received from each of at least one eNB and the AP, an IP address of the at least one eNB, SSID, IMSI of the UE 100, and a beam ID, a sector ID, and a cell ID of a signal received from the at least one eNB. The measurement report message may also include information about an eNB among the at least one eNB, which sent a signal having the greatest RSSI.

In operation 1304, the AP may send a handover ready request message to an HSS, e.g., the HSS 170, to enable the UE 100 to perform handover to the eNB. Here, the handover ready request message may include the IMSI and IP address of the UE 100 and an IP address of the eNB.

In operation 1306, the AP may receive a handover ready response message from the HSS 170 as a response to the handover ready request message. The handover ready response message may include the IMSI and IP address of the UE 100 and the IP address of the eNB.

In operation 1308, the AP may send the UE 100 a handover ready response message indicating that handover is ready. In operation 1310, the AP may determine whether a handover request message requesting for handover to the eNB is received from the UE 100. Upon reception of the handover request message in operation 1310, in operation 1312 the AP may send an HSS, e.g., the HSS 170, a data request message such that data transmission to the UE 100 may be performed from the eNB.

If the handover request message is not received from the UE 100 in operation 1310, the AP proceeds to operation 1314 to send the UE 100 a handover request message requesting for handover to the eNB. In operation 1312, the AP may send a data request message to the HSS 170 such that data transmission to the UE 100 may be performed from the eNB.

In accordance with the various embodiments of the present disclosure, a fast handover may be achieved by performing authentication and association procedures for handover between heterogeneous networks, thereby increasing quality of service and user convenience.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for performing a handover by a user equipment (UE) in a wireless communication system, the method comprising:
    transmitting, to a first node, a first measurement report message while being provided a communication service from the first node using a first frequency band, the first measurement report message including measurements for the first node and at least one other node using a different frequency band than the first frequency band, and first identifier (ID) information including at least one of a beam ID and a sector ID detected for the first node, the at least one other node being included in a handover candidate node list managed by the UE;
    receiving, from the first node, a first handover preparation request message requesting the UE to transmit a second handover preparation request message including an internet protocol (IP) address of the UE to a second node determined from among the at least one other node based on the first measurement report message;
    transmitting, to the second node, the second handover preparation request message to proceed with authentication for the handover from the first node to the second node;
    receiving, from the second node, a first response message in response to the second handover preparation request message including an IP address of the second node;
    determining whether the handover is necessary;
    transmitting, to the first node, a second measurement report message while being provided the communication service from the first node using the first frequency band, the second measurement report message including measurements for the first node and the at least one other node, and second ID information including at least one of the beam ID and the sector ID detected for the first node, if the handover is not necessary; and
    receiving, from the first node, an update request message for requesting an update of the handover candidate node list if the second ID information is different from the first ID information, and updating the handover candidate node list.

2. The method of claim 1,
    wherein the first measurement report message further comprises a received signal strength indication (RSSI) of each of the first node and the at least one other node, an IP address of the at least one other node, and a service set identification (SSID), an international mobile subscriber identity (IMSI) of the UE, and a cell ID of the first node, and
    wherein the second handover preparation request message further comprises the IMSI.

3. The method of claim 1, further comprising:
    stopping transmission of data to the first node;
    transmitting, to the first node, a first handover request message requesting the handover from the first node to the second node; and
    receiving data from the second node.

4. The method of claim 3, further comprising:
transmitting, to the second node, a third measurement report message, including measurements for the second node using a second frequency band and at least one other node using a different frequency band than the second frequency band;
transmitting, to a third node, a second handover request message, requesting a handover from the second node to the third node determined from among the at least one other node based on the third measurement report message, if a second response message including an IP address of the third node is received from the third node; and
receiving data from the third node.

5. A method for performing a handover by a first node in a wireless communication system, the method comprising:
receiving, from a user equipment (UE), a first measurement report message while being provided a communication service from the first node to the UE using the first frequency band, the first measurement report message including measurements for the first node that uses a first frequency band and at least one other node using a different frequency band than the first frequency band, and first identifier (ID) information including at least one of a beam ID and a sector ID detected by the UE for the first node, the at least one other node being included in a handover candidate node list managed by the UE;
transmitting, to the UE, a first handover preparation request message requesting the UE to transmit a second handover preparation request message including an internet protocol (IP) address of the UE to a second node, if the second node is determined as a target node for the handover among the at least one other node based on the first measurement report message;
receiving, from the UE, a second measurement report message while being provided a communication service from the first node to the UE using the first frequency band, the second measurement report message including measurements for the first node and the at least one other node, and second ID information including at least one of the beam ID and the sector ID detected by the UE for the first node; and
transmitting, to the UE, an update request message for requesting an update of the handover candidate node list if the second ID information is different from the first ID information,
wherein the second handover preparation request message is to proceed with authentication for the handover from the first node to the second node,
wherein the second measurement report message is transmitted by the UE, if a first response message in response to the second handover preparation request message including an IP address of the second node is received by the UE, and the UE determine the handover is not necessary, and
wherein the handover candidate node list is updated based on the update request message.

6. The method of claim 5,
wherein the first measurement report message further comprises a received signal strength indication (RSSI) of each of the first node and the at least one other node, an IP address of the at least one other node, and a service set identification (SSID), an international mobile subscriber identity (IMSI) of the UE, and a cell ID of the first node, and wherein the second handover preparation request message further comprises the IMSI.

7. The method of claim 6, further comprising:
receiving, from the UE, an update response message including an updated handover candidate node list.

8. The method of claim 5, further comprising:
stopping transmission of data to the UE if a measurement value of the second node is greater than a measurement value of the first node;
transmitting, to the UE, a handover request message requesting to perform the handover from the first node to the second node; and
transmitting, to a server, a data request message requesting data to be transmitted to the second node.

9. A method for performing a handover by a first node in a wireless communication system, the method comprising:
receiving, from a user equipment (UE), a first handover preparation request message including an internet protocol (IP) address of the UE, if the first node is determined as a target node for the handover based on a first measurement report message, the first measurement report message being transmitted to a second node by the UE while being provided a communication service to the UE from the second node using a first frequency band;
transmitting, to a server, a second handover preparation request message including the IP address of the UE and an IP address of the first node;
receiving a first response message, as a response to the second handover preparation request message, including the IP address of the first node from the server,
transmitting the first response message to the UE; and
receiving, from the UE, a third handover preparation request message including the IP address of the UE, if the first node is determined as the target node based on a second measurement report message, the second measurement report message being transmitted to the second node by the UE while being provided the communication service to the UE from the second node using the first frequency band,
wherein the first measurement report message includes measurements for the second node and at least one other node using a different frequency band than the first frequency band, and first identifier (ID) information including at least one of a beam ID and a sector ID detected for the second node, the at least one other node being included in a handover candidate node list managed by the UE,
wherein the second measurement report message includes measurements for the first node and the at least one other node, and second ID information including at least one of the beam ID and the sector ID detected by the UE for the second node,
wherein the handover candidate node list is updated if the second ID information is different from the first ID information,
wherein the first node is included in the at least one other node, and
wherein the first handover preparation request message is to proceed with authentication for the handover from the second node to the first node.

10. The method of claim 9, further comprising:
transmitting, to the server, a fourth handover preparation request message including the IP address of the UE and the IP address of the first node;

receiving, from the server, a second response message including the IP address of the first node, as a response to the fourth handover preparation request message; and transmitting, to the UE, the second response message.

11. The method of claim 10, further comprising transmitting, to the UE, a handover request message instructing to perform the handover from the second node to the first node if a measurement value of the first node is greater than a measurement value of the second node.

12. The method of claim 9, wherein the first handover preparation request message further comprises an international mobile subscriber identity (IMSI) of the UE, and the second handover preparation request message further comprises the IMSI.

13. A user equipment (UE) in a wireless communication system, the UE comprising:
a transceiver; and
a processor configured to control the transceiver to:
transmit, to a first node, a first measurement report message while being provided a communication service from the first node using a first frequency band, the first measurement report message including measurements for the first node and at least one other node using a different frequency band than the first frequency band, and first identifier (ID) information including at least one of a beam ID and a sector ID detected for the first node, the at least one other node being included in a handover candidate node list managed by the UE,
receive, from the first node, a first handover preparation request message requesting the UE to transmit a second handover preparation request message including an internet protocol (IP) address of the UE to a second node determined from among the at least one other node based on the first measurement report message,
transmit, to the second node, the second handover preparation request message to proceed with authentication for a handover from the first node to the second node,
receive, from the second node, a first response message in response to the second handover preparation request message including an IP address of the second node,
determine whether the handover is necessary,
transmit, to the first node, a second measurement report message while being provided the communication service from the first node using the first frequency band, the second measurement report message including measurements for the first node and the at least one other node, and second ID information including at least one of the beam ID and the sector ID detected for the first node, if the handover is not necessary, and
receive, from the first node, an update request message for requesting an update of the handover candidate node list if the second ID information is different from the first ID information, and update the handover candidate node list.

14. The UE of claim 13,
wherein the first measurement report message further comprises a received signal strength indication (RSSI) of each of the first node and the at least one other node, an IP address of the at least one other node, and a service set identification (SSID), an international mobile subscriber identity (IMSI) of the UE, and a cell ID of the first node, and
wherein the second handover preparation request message further comprises the IMSI.

15. The UE of claim 13, wherein the processor is further configured to control the transceiver:
stop transmission of data to the first node,
transmit, to the first node, a first handover request message requesting the handover from the first node to the second node, and
receive data from the second node.

16. The UE of claim 15, wherein the processor is further configured to control the transceiver to:
transmit, to the second node, a third measurement report message including measurements for the second node using a second frequency band and at least one other node using a different frequency band than the second frequency band,
transmit, to a third node, a second handover request message requesting a handover from the second node to the third node determined from among the at least one other node based on the third measurement report message if a second request message including an IP address of the third node is received from the third node, and
receive data from the third node.

17. A first node in a wireless communication system, the first node comprising:
a transceiver; and
a processor configured to control the transceiver to:
receive, from a user equipment (UE), a first measurement report message while being provided a communication service from the first node to the UE using the first frequency band, the first measurement report message including measurements for the first node using a first frequency band and at least one other node using a different frequency band than the first frequency band, and first identifier (ID) information including at least one of a beam ID and a sector ID detected by the UE for the first node, the at least one other node being included in a handover candidate node list managed by the UE,
transmit, to the UE, a first handover preparation request message requesting the UE to transmit a second handover preparation request message including an internet protocol (IP) address of the UE to a second node, if the second node is determined as a node for the handover among the at least one other node based on the first measurement report message,
receive, from the UE, a second measurement report message while being provided a communication service from the first node to the UE using the first frequency band, the second measurement report message including measurements for the first node and the at least one other node, and second ID information including at least one of the beam ID and the sector ID detected by the UE for the first node, and
transmit, to the UE, an update request message for requesting an update of the handover candidate node list if the second ID information is different from the first ID information,
wherein the second handover preparation request message is to proceed with authentication for the handover from the first node to the second node,
wherein the second measurement report message is transmitted by the UE, if a first response message in response to the second handover preparation request message including an IP address of the second node is received by the UE, and the UE determine the handover is not necessary, and wherein the handover candidate node list is updated based on the update request message.

18. The first node of claim 17,
wherein the first measurement report message further comprises a received signal strength indication (RSSI) of each of the first node and the at least one other node, an IP address of the at least one other node, and a service set identification (SSID), an international mobile subscriber identity (IMSI) of the UE, and a cell ID of the first node, and
wherein the second handover preparation request message further comprises the IMSI.

19. The first node of claim 18, wherein the processor is further configured to control the transceiver to:
receive, from the UE, an update response message including an updated handover candidate node list.

20. The first node of claim 17, wherein the processor is configured to control the transceiver:
stop transmission of data to the UE if a measurement value of the second node is greater than the measurement value of the first node,
transmit, to the UE, a handover request message requesting to perform the handover from the first node to the second node, and
transmit, to a server, a data request message requesting data to be transmitted to the second node.

21. A first node in a wireless communication system, the first node comprising:
a transceiver; and
a processor configured to control the transceiver to:
receive, from a user equipment (UE), a first handover preparation request message including an internet protocol (IP) address of the UE, if the first node is determined as a target node for the handover based on a first measurement report message, the first measurement report message being transmitted to a second node by the UE while being provided a communication service to the UE from the second node using a first frequency band,
transmit, to a server, a second handover preparation request message including the IP address of the UE and an IP address of the first node,
receive a first response message, as a response to the second handover preparation request message, including the IP address of the first node from the server,
transmit the first response message to the UE, and
receive, from the UE, a third handover preparation request message including the IP address of the UE, if the first node is determined as the target node based on a second measurement report message, the second measurement report message being transmitted to the second node by the UE while being provided the communication service to the UE from the second node using the first frequency band,
wherein the first measurement report message includes measurements for the second node and at least one other node using a different frequency band than the first frequency band, and first identifier (ID) information including at least one of a beam ID and a sector ID detected for the second node, the at least one other node being included in a handover candidate node list managed by the UE,
wherein the second measurement report message includes measurements for the first node and the at least one other node, and second ID information including at least one of the beam ID and the sector ID detected by the UE for the second node;
wherein the handover candidate node list is updated if the second ID information is different from the first ID information,
wherein the first node is included in the at least one other node, and
wherein the first handover preparation request message is to proceed with authentication for the handover from the second node to the first node.

22. The first node of claim 21, wherein the processor is configured to control the transceiver to:
transmit, to the server, a fourth handover preparation request message including the IP address of the UE and the IP address of the first node,
receive, from the server, a second response message including the IP address of the first node, as a response to the fourth handover preparation request message, and
transmit, to the UE, the second response message.

23. The first node of claim 22, wherein the transceiver transmit to the UE a handover request message instructing to perform handover from the second node to the first node if a measurement value of the first node is greater than a measurement value of the second node.

24. The first node of claim 21, wherein the first handover preparation request message further comprises an international mobile subscriber identity (IMSI) of the UE, and the second handover preparation request message further comprises the IMSI.

* * * * *